United States Patent [19]

Parliment et al.

[11] Patent Number: 4,857,340

[45] Date of Patent: Aug. 15, 1989

[54] AROMA RELEASE DURING MICROWAVE COOKING

[75] Inventors: Thomas H. Parliment, New City, N.Y.; Joseph J. Cipriano, Cranbury; Richard Scarpellino, Ramsey, both of N.J.

[73] Assignee: General Foods Corporation, White Plains, N.Y.

[21] Appl. No.: 166,067

[22] Filed: Mar. 9, 1988

[51] Int. Cl.⁴ ...................... A23L 1/025; A23L 1/221; A23L 1/226
[52] U.S. Cl. .......................................... 426/96; 426/99; 426/89; 426/107; 426/234; 426/241; 426/242; 426/243
[58] Field of Search ................. 426/99, 107, 234, 241, 426/243, 89, 96

[56] References Cited

U.S. PATENT DOCUMENTS

| | | | |
|---|---|---|---|
| 3,256,101 | 6/1966 | Arns | 99/221 |
| 3,949,094 | 4/1974 | Johnson et al. | 426/99 |
| 4,316,070 | 2/1982 | Prosise et al. | 219/10.55 E |
| 4,448,791 | 5/1984 | Fulde et al. | 426/243 X |
| 4,795,649 | 1/1989 | Kearns et al. | 426/423 |

*Primary Examiner*—Joseph Golian
*Attorney, Agent, or Firm*—Thomas A. Marcoux; Thomas R. Savoie; Daniel J. Donovan

[57] ABSTRACT

A composition of an aroma-producing material enrobed in a fusible encapsulating agent preferably a lipid and in conductive heat transfer relationship with a microwave susceptible material, when combined with a microwaveable comestible or package will provide an aroma when the comestible or package is prepared by subjecting said comestible or package and said composition to microwave energy.

6 Claims, No Drawings

AROMA RELEASE DURING MICROWAVE COOKING

BACKGROUND OF THE INVENTION

1. Field of the Invention

This invention relates to the microwave preparation of food. More particularly, it relates to the release of food aromas during the microwave preparation of food. This invention especially relates to compositions which will release aromas of cooking food during microwave preparation of comestibles.

2. Description of the Prior Art

Microwave ovens for home use have found widespread acceptance. The fact that the cooking and/or reheating of food in the domestic microwave oven is achieved in such relatively short periods of time is probably the principal reason for the high sales of these units in recent years.

Essentially all domestic microwave ovens operate at 2450 MHz. The dielectric properties of food at this frequency parallels those of water which is the principal lossy constituent of food. The absorption of microwave energy by food by the interaction of the dipole water molecule in the microwave field results in a localized heating resulting in the desired cooking or reheating. Despite the widespread use of microwave ovens, a major shortcoming involved in their use is the lack of desirable aroma release from comestibles during their preparation by microwave heating. The reason for this may be attributed to the basic functioning of the microwave oven. Since the action of microwave energy on the dipole water molecule is the principal cause of heat generation within the water-containing comestible, the maximum temperature obtainable on a comestible surface exposed to microwave energy is about 100° C. In a thermal oven, normal cooking and roasting temperatures are in the range of about 175° to about 235° C. (350°–450° F.). Further, the short cooking times achieved by using a microwave oven may also contribute to the lack of aroma generation from the comestible. It is thought that the combination of temperatures in excess of 100° C. and periods of time in excess of about 5 minutes are necessary for the typical generation and release of the familiar roasting or cooking aromas. Thus, the very features of the microwave oven which make it so attractive to people anxious to quickly prepare a tasty meal, prevent the generation of kitchen aromas which would be harbingers of the upcoming meal.

The generation or release of aromas from comestibles being prepared in a microwave oven would enhance the usefulness of this appliance, as well as, increasing the acceptance of microwaveable convenience foods provided with an appropriate aroma-releasing composition.

It is an object of this invention to provide aroma release during microwave preparation of comestibles.

It is another object of the invention to provide aroma-producing compositions for use when comestibles are prepared in a microwave oven.

It is a further object of this invention to provide a means for providing aroma with a comestible package for sale to, and preparation in a microwave oven by, a consumer.

The achievement of these and other objects will be apparent from the following description of the subject invention.

SUMMARY OF THE INVENTION

In accordance with the present invention, it has been found that microwave cooking can be made pleasant and enjoyable by including, in the microwaveable package of a comestible, an aroma-producing composition which, upon being subjected to microwave energy, releases an aroma which people associate with the cooking of the particular comestible. In particular, by enrobing an aroma-producing material with a fusible encapsulating agent, preferably a solid lipid, placing the lipid-aroma producing combination in conductive heat transfer relationship with a microwave susceptible material and affixing the resulting composition to a microwaveable comestible or microwaveable packaging, an aroma can be produced when the comestible and/or package is subjected to microwave energy.

More particularly, this invention relates to an aroma-producing composition comprising: (a) a first mixture of an aroma-producing material admixed with an effective amount of a fusible encapsulating agent preferably a lipid and (b) an effective amount of a microwave susceptible material in conductive heat transfer relationship with said first mixture, said amount of said lipid being effective to enrobe said aroma-producing material so as to inhibit the release of aroma at ambient or storage temperatures, said amount of said microwave susceptible material being effective, when irradiated with microwave energy, to provide sufficient heat to cause said lipid to melt causing said aroma producing material to release its aroma.

In another aspect of this invention, the aroma-producing composition is combined with a microwaveable comestible and/or a microwaveable package so that an aroma is released when the comestible is prepared in a microwave oven.

In yet another concept of this invention, a method of producing an aroma comprises subjecting the aroma-producing composition described above to an effective amount of microwave energy.

DESCRIPTION OF THE PREFERRED EMBODIMENTS

The present invention relates to providing cooking aromas when comestibles are prepared in a microwave oven. In many situations, the preparation time in a microwave oven for a given comestible is too short for the comestible to generate and release the normal aromas associated with its cooking. Therefore, any aroma-generating system which may be employed to provide the usual cooking aromas and which requires heat to release its aroma must be heated quickly in order to generate the required aroma within the short-term microwave preparation process.

In accordance with the present invention, a composition is provided which generates an aroma when it is subjected to microwave radiation. Since the composition is intended for use with a comestible being prepared in a microwave oven, it hardly must be stressed that the aroma produced by the composition should be one normally associated with the cooking of the subject comestible. A microwaveable package of apple pie could be provided with an aroma one associates with the baking of an apple pie, such as that provided by the combined aromas from hexyl acetate (an apple aroma) and other volatile compounds.

The aroma-producing composition of this invention comprises three elements: (a) a material to produce the aroma, (b) a material that prevents the aroma-producing material from releasing the aroma until it is required and (c) a material which causes the aroma to be released.

The element in the composition of this invention which produces the aroma may be from a food, ground spice, coffee, etc. which are known to contain volatile aromas. Thus, chemicals providing odors associated with the cooking of comestibles may be employed singularly or in combination to provide the desired aroma, which often is a combination of individual odors or aromas. In addition, the desired aroma may be produced from a precursor of an individual chemical which provides the single identifiable odor. Chemicals which provide the desired aromas are well known in the art. Thus, there are chemicals which can provide the aroma of cherries, apples, baking bread, roasting meat, melted butter, popcorn, and the like. The table below lists some representative flavor materials which provide various flavor characters.

TABLE 1

| Flavor Character | Flavor Materials |
|---|---|
| Apple | hexyl acetate |
| | ethyl 2-methylbutyrate |
| Blueberry | linalool/hexenol mixtures |
| Butter | diacetyl |
| Cherry | benzaldehyde |
| | tolyl aldehyde |
| Chocolate | 5-methyl-2-phenol-2-hexenal |
| | isoamyl butyrate |
| Meat | methyl-5-($\beta$-hydroxyethyl)thiazole |
| Peach | $\gamma$-undecalactone |
| | 6-amyl-$\alpha$-pyrone |
| Popcorn | methyl 2-pyridyl ketone |
| Potato | methional |
| | 2,3-dimethylpyrazine |
| Raspberry | 6-methyl-$\alpha$-ionone |
| | trans-$\alpha$-ionone |
| | p-hydroxyphenyl-2-butanone |
| Seafood | pyridine |
| | piperidine |
| | trimethylamine |
| Smoke | guaicol |
| | 2,6-dimethoxyphenol |
| Tomato | isobutylthiazole |
| | cis-4-heptenal |

Other flavor characters, well known to those skilled in the art may be provided by selection of appropriate flavor materials. Where the comestible being prepared in the microwave oven requires a combination of aromas normally associated with its preparation, a combination of the flavor materials may be employed.

The aroma-producing materials are conventionally, volatile liquids or solids which at slightly elevated temperatures, will volatilize releasing their aroma. Since these materials will often release their aromas at room temperature, it is desirable to stabilize these materials until the release of the aroma is desired. Therefore, it is appropriate to provide in the composition of this invention a fusible encapsulating agent which will enrobe the aroma, prevent oxidation and act as a carrier for the total system to inhibit or prevent the aroma-producing material from releasing its volatile aroma until such is required. Further, this inhibitor material must be stable, and essentially inert to the aroma-producing material and must remain stable for prolonged periods of time at refrigerated, frozen or normal storage temperatures, particularly, when the composition of the invention is associated with a comestible. Its enrobing and solidifying function will not only protect volatiles from escaping prior to microwaving, but it will also prevent diffusion of the aroma-producing material into the product away from the desired point of application. The total aroma system will stay where it is applied until subject to microwave irradiation thereby releasing the aromas. One class of materials found particularly useful in providing this function are the lipids. When employed in the subject invention, lipids are used as a matrix or an enrobing agent to encompass the aroma-producing material to prevent its inadvertent release. Not only do lipids prevent the inadvertent release of the aroma, but since they are semi-solids at room temperature, they are fusible at temperatures sufficiently below the normal cooking temperatures encountered in a microwave oven. In this manner they will rapidly become liquid thereby permitting the release of the aroma from the aroma-producing materials enrobed therein. Useful lipids or fats include such animal and vegetable fats as lard, tallow, butter and mono, di and triglycerides. Also the fusible encapsulating agent may comprise a high boiling ester or organic acid, waxes, such as carnuba and beeswax and paraffins. The fusible encapsulating agent need not be food approved if, for example it is applied on microwave packaging not in direct contact with the comestible. However, if it is in contact with the comestible, either adjacent to or topically applied, it should be food approved.

To ensure that the fusible encapsulating agent, preferably a lipid, will melt rapidly so as to release the aroma while the comestible is being prepared in a microwave oven, it is desirable that a source of heat be provided in conductive heat transfer relationship with the aroma material containing lipid. In this fashion, melting of the lipid will be ensured, i.e., within a time period of from about 10 to about 180 seconds, thereby releasing the aroma within the microwave oven so that those in the vicinity will be apprised of the preparation of the comestible. A microwave susceptible material is an ideal means for providing this source of heat since it will only provide heat when it is radiated with the microwave energy available in the microwave oven. The useful microwave susceptible materials preferably should be those which have a Curie temperature thereby preventing a temperature runaway when the microwave susceptible material is radiated with microwaves. Several solid materials find utility as the microwave susceptible material for use of the subject invention. Thus, ferrites and magnetites are solid materials which become heated when subjected to microwave energy and absorb energy up to their Curie temperature beyond which power absorption decreases and heating does not continue above that point. U.S. Pat. Nos. 2,830,162, 4,266,108 and 4,663,508 disclose the use of ferrites and U.S. Pat. No. 4,542,271 discloses the use of magnetite as sources of heat in microwave ovens. Films of microwave reactive material may also be employed. Suitable microwave interactive materials of this type which can be utilized in practice of the present invention include metalized layers of polyethylene terephthalate or polyester as disclosed in U.S. Pat. Nos. 4,533,010, 4,590,349 and 4,594,492. A number of microwave reactive liquids can also find use in the subject invention. Organic liquids which possess a high dielectric loss factor as well as a high boiling point i.e., greater than 150° C. may be employed The microwave reactive liquids are preferably selected from the following groups; polyols between $C_2$–$C_6$; polyoxyethylene sorbitan esters i.e. Tweens; sorbitan esters i.e. Spans; and acetates of glycerol, i.e., monoacetin, diacetin and triacetin and combinations of liquids representative of two or more of the groups. Most preferred liquids are glycerol and propylene glycol. Liquids of this type and their use as microwave-susceptible materials are disclosed in a copending application identified as Ser. No. 166,062 filed Mar. 9, 1988 U.S. Pat. No. 4,795,649 which issued Jan. 3, 1989. Additionally, combinations of microwave susceptible materials may be employed, i.e. ferrite solid materials in combination with glycerol.

In the practice of this invention, the aroma-producing material, often a liquid, in an amount sufficient to generate aroma when subjected to microwave irradiation, is enrobed with the lipid by melting the lipid, mixing the aroma-producing material therewith and permitting the mixture to solidify at room temperature. It has been found that the amount of aroma-producing material will vary depending upon the potency of the aroma generated, in some cases only a small quantity of the aroma-producing material need be employed. The aroma-producing material may comprise $1 \times -10^{-10}$ to 50, preferably 0.01 to 10 weight percent of the combined weight of the lipid plus the aroma-producing material.

To most effectively practice this invention, the combination of the aroma-producing material and the lipid is placed in conductive heat transfer relationship with the microwave susceptible material. The microwave susceptible material, whether it be a solid or liquid material, is capable of converting microwave energy to heat. Thus, where a ferrite or magnetite containing solid is employed, the lipid-aroma producing material combination may merely be placed in contact of the solid ferrite or magnetite. In a similar fashion, when a film of microwave susceptible material is employed again the lipid-aroma-producing material composition is merely placed in contact of the polyester film. Ideally, this contact can be assured by means of an adhesive or a securing strap of microwave inert material. The size of a solid microwave susceptible material may vary with the proviso that the solid material generate sufficient heat when exposed to microwave irradiation to melt the fusible encapsulating agent within from 10 seconds to 180 seconds thereby releasing the aroma.

When one of the above-described microwave susceptible liquids is employed as the source of heat in the composition of this invention, it is most conveniently employed by admixing it with the combination of the lipid and the aroma-producing material. This may effectively be achieved by melting the lipid and combining the aroma-producing material and the microwave susceptible liquid therewith and then permitting the composition to solidify. It has been found that where the microwave susceptible liquid is employed it will constitute 1 to 50, preferably 5 to 40 weight percent of the total composition.

The aroma producing compositions of this invention are particularly effective when combined with microwaveable packaged comestibles. The aroma-producing composition should ideally be affixed to the comestible package in a manner such that when the comestible is heated in the microwave oven, usually in the package in which it was purchased, the aroma produced from the composition of the subject invention is released into the microwave oven and then to the surrounding environment providing those in the vicinity with an aroma of the comestible being prepared. Topical application of this aroma releasing system to a food product provides an effective means for achieving aroma enhancement during microwave cooking. With the availability of natural and synthetic aroma chemicals, the possibility exists for providing aromas for most microwaveable comestibles.

Also contemplated by the instant invention is the production of an aroma release system whose main function is to deodorize the area adjacent to the microwave. In this instance the aroma produced may be of the non-food type, i.e., pine, woody, etc. which is intended upon being released to be distributed throughout the adjacent microwave area by the forced air oven exhaust system in the microwave oven.

The following examples illustrate the practice of this invention.

EXAMPLE 1

A combination natural/artificial butter aroma release system was prepared from the following ingredients:

| Ingredient | Percentage by Weight |
|---|---|
| Paramount xx manufactured by Durkee, Hard butter m.p. 118° F. | 40% |
| Tween 60 (polyoxyethylene (20) sorbitan monostearate)-(ICI Americas Inc.-manufacturer) | 10% |
| Glycerol | 30% |
| Artificial Butter Flavor (10% active ingredients, 90% propylene glycol) | 10% |
| Natural Butter Flavor (C. Hansen's Laboratory) | 10% |
| | 100% |

The ingredients were warmed to melt the hard butter and the liquid obtained was topically applied to a coffee ring cake product at a usage level of 0.7 to 1.0 gram of aroma release system per 200 grams of cake. Therefore the composition solidified. An approximate 200 gram piece of the cake was placed in a microwave oven at the high setting for approximately 60 seconds. A pleasant butter aroma eminated from the microwave.

EXAMPLE 2

An artificial coffee-mocha aroma released system was prepared from the following ingredients:

| Ingredient | Percentage by Weight |
|---|---|
| Paramount xx (Hard butter) | 40.0 |
| Tween 60 | 10.0 |
| Glycerol | 30.0 |
| Propylene Glycol | 17.5 |
| Coffee Mocha Aroma (15% active flavor ingredients, 85% flavor carrier) | 2.5 |

All ingredients were combined and warmed (to melt the hard butter) and approximately 0.15 g of the above aroma release system was applied to a one-half inch square of a solid microwave susceptible materials, a ferrite containing paperboard tray. Upon standing the composition cooled and solidified. The combination was placed in a microwave oven at the high setting for 20 to 30 seconds. A coffee mocha aroma filled the room.

EXAMPLE 3

In a similar manner as set forth in Example 2, a natural coffee aroma release system was prepared containing the following ingredients:

| Ingredient | Percentage by Weight |
| --- | --- |
| Roasted and Ground Coffee | 20.0% |
| Paramount xx (Hard butter) | 80.0% |
| | 100.0% |

In a similar fashion, 0.5 grams of the aroma release system was placed on a one square inch board identical to the solid microwave susceptible material previously described in Example 2 and the combination was placed into the microwave on a high setting for 20 to 30 seconds. A strong but pleasant fresh-brewed coffee aroma permeated the room.

EXAMPLE 4

A natural grill aroma release system was prepared from the following ingredients:

| Ingredient | Percentage by Weight |
| --- | --- |
| Paramount xx (Hard butter) | 40.0 |
| Tween 60 | 10.0 |
| Glycerol | 30.0 |
| Propylene Glycol | 5.0 |
| Natural Grill Flavor | 5.0 |
| H$_2$O | 10.0 |
| | 100.0 |

The natural grill flavor was produced by the process set forth in U.S. Pat. No. 4,571,342 issued to DiCicca et al which is commonly assigned. Approximately 0.5 grams of the aroma release system was applied to the solid microwave susceptible material previously described in Example 2 and the combination was placed in a microwave oven at the high setting for 20 to 30 seconds. A charred, meaty flavor was emitted from the microwave oven.

EXAMPLE 5

Ten gram batches of Crisco brand vegetable shortening were obtained and each was combined with 0.3 grams of cinnamon bark oil. 1.0 grams of glycerol was added to one of the batches. Both samples were warmed to melt the shortening and then were cooled with stirring to produce a solid fixed cinnamon flavor.

Each of the solid samples were separately placed in a microwave oven at high power for 20 seconds. At the end of that period of time, the experimental sample containing the glycerol was molten and had released its cinnamon flavor while the control sample remained solid and had released substantially none of its flavor.

EXAMPLE 6

One hundred grams of Armour brand lard were melted and homogenized with 4 grams of glycerol, 1 gram of water and 300 milligrams of a selected spice, cinnamon oil, ground cinnamon or Almond oil. A portion of each of these samples was placed in a 700 watt microwave oven for various periods of time and the results were observed. The results are presented in the table below.

| Spice Added | Observation at Seconds | | | | Aroma |
| --- | --- | --- | --- | --- | --- |
| | 15 | 30 | 45 | 60 | |
| Cinnamon Oil | N/C | sl melt | liquid | liquid | Cinnamon |
| Cinnamon-ground | N/C | sl melt | liquid | liquid | Cinnamon |
| Almond Oil | N/C | sl melt | liquid | liquid | Cherry |
| None | N/C | sl melt | melted | liquid | none |
| Plain Lard | N/C | N/C | N/C | N/C | none |

Note:
N/C - No change in physical appearence.

From the above results it is seen that when practicing the subject invention an aroma is released when irradiated with microwaves.

What is claimed is:

1. An aroma-producing composition comprising:
   (a) a first mixture of an aroma-producing material, admixed with an effective amount of a fusible encapsulating agent, said amount of said fusible encapsulating agent being effective to enrobe said aroma-producing material so as to inhibit the release of aroma at ambient or storage temperatures said fusible encapsulating agent being selected from the group consisting of high boiling esters, high boiling organic acids, lipids, waxes, paraffin and combinations thereof; and
   (b) an effective amount of a microwave susceptible material selected from the group consisting of glycerol, propylene glycol and combinations thereof in conductive heat transfer relationship with said first mixture, said amount of said microwave susceptible material being effective, when irradiated with microwave energy, to provide sufficient heat to cause said fusible encapsulating agent to melt causing said aroma-producing material to release its aroma.

2. The composition of claim 1 in combination with a packaged comestible.

3. A composition according to claim 1 wherein said liquid is glycerol.

4. A composition according to claim 1 wherein said fusible encapsulating agent is a lipid.

5. A composition according to claim 4 wherein the lipid comprises animal fat which is solid at room temperature.

6. A composition according to claim 4 wherein the lipid comprises vegetable fat which is solid at room temperature.

* * * * *